US009858290B1

(12) United States Patent
Bent et al.

(10) Patent No.: US 9,858,290 B1
(45) Date of Patent: Jan. 2, 2018

(54) CLUSTER FILE SYSTEM WITH A FUSE FILE SYSTEM INTERFACE

(71) Applicant: EMC IP Holding Company LLC, Hopkinton, MA (US)

(72) Inventors: John M. Bent, Los Alamos, NM (US); Sorin Faibish, Newton, MA (US); Uday Gupta, Westford, MA (US); James Pedone, West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 13/928,966

(22) Filed: Jun. 27, 2013

(51) Int. Cl.
*G06F 17/30* (2006.01)

(52) U.S. Cl.
CPC .. *G06F 17/30203* (2013.01); *G06F 17/30218* (2013.01); *G06F 17/30224* (2013.01); *G06F 17/30233* (2013.01)

(58) Field of Classification Search
CPC ....... G06F 17/30218; G06F 17/302224; G06F 17/30233; G06F 17/30203
See application file for complete search history.

(56) References Cited

U.S. PATENT DOCUMENTS

| | | | | |
|---|---|---|---|---|
| 7,783,757 B2* | 8/2010 | Plamondon | ......... | H04L 67/2847 709/217 |
| 8,756,687 B1* | 6/2014 | Klein | ..................... | G06F 21/80 713/194 |
| 2010/0017422 A1* | 1/2010 | Sudhakar | .......... | G06F 17/30126 707/E17.005 |
| 2010/0132012 A1* | 5/2010 | van Riel | ................. | G06F 21/53 726/1 |
| 2012/0265792 A1* | 10/2012 | Salters | .................... | G01C 21/26 707/822 |
| 2013/0159364 A1* | 6/2013 | Grider et al. | .................. | 707/826 |
| 2013/0227194 A1 | 8/2013 | Kannan et al. | | |
| 2014/0032872 A1* | 1/2014 | Vasavi | .................. | G06F 3/0605 711/172 |
| 2014/0040286 A1* | 2/2014 | Bane | ................. | G06F 17/30253 707/754 |

(Continued)

OTHER PUBLICATIONS

Cluster File Systems, Inc., Lustre: A Scalable, High-Performance File System, Nov. 2002, pp. 1-13.*

(Continued)

*Primary Examiner* — Alicia Willoughby
(74) *Attorney, Agent, or Firm* — Ryan, Mason & Lewis, LLP

(57) ABSTRACT

Cluster file systems are provided having a FUSE interface. A cluster file system comprises a FUSE object storage device that communicates with at least one object storage server of the cluster file system; and provides an interface between the cluster file system and at least one additional file system having a FUSE implementation. The additional file system optionally includes a burst buffer appliance. The burst buffer appliance can be configured, for example, to control the movement of data between first and second storage tiers. The burst buffer appliance can optionally communicate with a plurality of clients over the network and process requests from the clients. The FUSE object storage device provides an interface to, for example, a parallel log-structured file system and/or a Lustre clustered file system.

21 Claims, 4 Drawing Sheets

(56) References Cited

U.S. PATENT DOCUMENTS

| | | | | |
|---|---|---|---|---|
| 2014/0108707 A1* | 4/2014 | Nowoczynski | ..... | G06F 12/0246 711/103 |
| 2014/0258222 A1* | 9/2014 | Guo | ................ | G06F 17/30132 707/610 |
| 2014/0351300 A1* | 11/2014 | Uppu | ................ | G06F 17/30194 707/827 |

OTHER PUBLICATIONS

John Bent et al, PLFS: A Checkpoint Filesystem for Parallel Applications, Int'l Conf. for High Performance Computing, Networking, Storage and Analysis 2009 (Nov. 2009).*

Bent, John et al. "US Department of Energy Best Practices Workshop on File Systems & Archives: Usability at Los Alamos National Lab" Sep. 26-27, 2011.*

Cranor, Chuck et al. "HPC Computation on Hadoop Storage with PLFS". Parallel Data Laboratory, Carnegie Mellon University. Nov. 2012.*

Brittain, Richard. "FUSE—Filesystems in User Space". Dartmouth College, Jul. 2007.*

Administrator Guide, "Accessing Data—Selling Up GlusterFS Client", downloaded from http://gluster.readthedocs.io/en/latest/Administrator%20Guide/.

* cited by examiner

FIG. 2

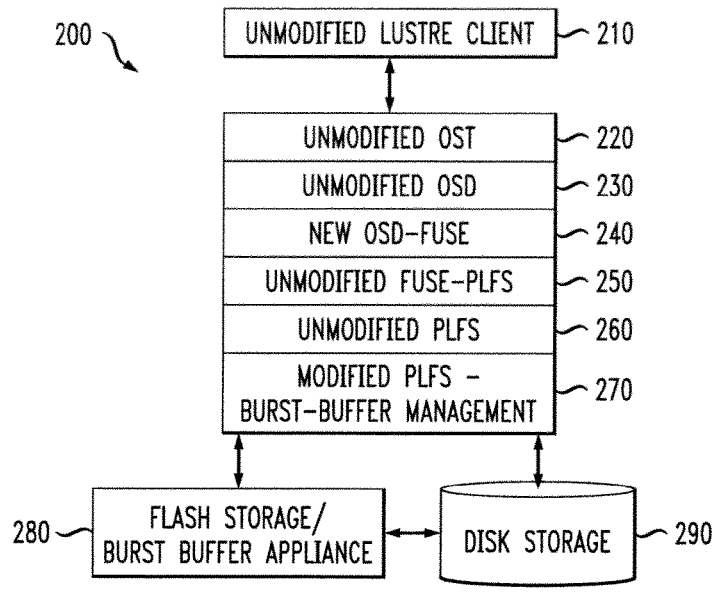

- 200
- UNMODIFIED LUSTRE CLIENT — 210
- UNMODIFIED OST — 220
- UNMODIFIED OSD — 230
- NEW OSD-FUSE — 240
- UNMODIFIED FUSE-PLFS — 250
- UNMODIFIED PLFS — 260
- MODIFIED PLFS – BURST-BUFFER MANAGEMENT — 270
- FLASH STORAGE/BURST BUFFER APPLIANCE — 280
- DISK STORAGE — 290

FIG. 3

FUSE-OSD MAPPING PROCESS — 300

310 —
- OSD is object-based and FUSE is file-based:
- Create a FUSE file for each OSD object
- Optionally, create hierarchical directory structure to reduce numbers of files in a single directory in FUSE filesystem 320 —
- Punch Function does not have existing FUSE mapping
- Punch deallocates space within an existing file (i.e., make a hole)
- Create a zero-filled buffer along the punch dimensions and write the buffer
- Alternate: Add punch to the FUSE interface.

330 —
- FUSE is not transactional; OSD is transactional
- OSD is transactional because Lustre needs to make coordinated changes to a set of OSD files
- Run OSS in a battery-backed device to reduce probability of failure. When there is a power interruption, the battery-backed device will give the system enough time to shut down cleanly.
- Alternate: Add transactional support to the OSD-FUSE layer which would require that the FUSE file systems also have transactional support.
- Second Alternate: Accept that the lack of transactions increases the probability of corruption which means that fsck might need to be run more frequently following failures

FIG. 4

```
osd_object_init(object_id oid) {
    # determine where this object goes
    hierachical_dir_struct hds = find_dir_hierarchy(oid)

# ensure that the path exists
    ensure_dir_hierarchy(hds)

# create file by calling fuse corresponding function
    string full_path = make_path(hds, oid)
    return f_create(full_path) # this is the fuse function as defined in fuse
    interface
}
hierarchical_dir_struct find_dir_hierarchy( object_id oid ) {
    # create an N deep directory hierarchy where N is a mount option
    # use N different hash methods on oid to create an integral value for
    each dir
    # return that in a '/' delineated string or linked list
}
ensure_dir_hierarchy (hierarchical_dir_struct hds ) {
    foreach dir in hds { # hds was created in find_dir_hierarchy mkdir dir
    }
    # optimize to cache which dirs have already been created
}
```

FIG. 5

```
osd_object_delete(object_id oid) {
    # determine where this object should be
    hierachical_dir_struct hds = find_dir_hierarchy(oid)

# unlink file by calling fuse corresponding function
    string full_path = make_path(hds, oid)
    return f_unlink(full_path) # this is the fuse function as defined
    in fuse interface
}
```

FIG. 6

```
osd_object_punch(object_id oid, offset o, length l) {
    # determine where this object should be
    hierachical_dir_struct hds = find_dir_hierarchy(oid)

# check to see whether the FUSE filesystem has implemented punch
    string full_path = make_path(hds, oid)
    if (f_punch != NULL) {
        return f_punch(full_path,o,l) # this is the new FUSE function
    } else {
        # optimization: cache the zero-filled buf to avoid re-allocating
        every time
        char *buf = calloc(1, l) # get a zero-filled buffer of appropriate
        length
        return f_write(buf,o,l) # this is the old FUSE function
    }
}
```

CLUSTER FILE SYSTEM WITH A FUSE FILE SYSTEM INTERFACE

FIELD

The field relates generally to data storage, and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Traditional file systems typically store data on disks and then retrieve the stored data from the disks. Virtual file systems, however, do not actually store data. Rather, virtual file systems act as a view or translation of an existing file system or storage device. FUSE (File System in Userspace) is particularly useful for writing virtual file systems. FUSE is an existing file system abstraction with a well-defined interface. In principle, any resource that is available to a FUSE implementation can be exported as a file system. Parallel Log Structured File System (PLFS) and many other file systems have FUSE implementations.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that provide a FUSE interface, so as to provide significant improvements relative to conventional arrangements. For example, such arrangements allow for transparent inclusion of a flash storage tier in a cluster file system in a manner that avoids the need for any significant changes to clients, object storage servers, metadata servers or applications running on those devices.

In one embodiment, a cluster file system comprises a FUSE object storage device that communicates with at least one object storage server of the cluster file system; and provides an interface between the cluster file system and at least one additional file system having a FUSE implementation. In one exemplary embodiment, the at least one additional file system comprises a burst buffer appliance. The burst buffer appliance can be configured, for example, to implement storage tiering control functionality for at least first and second storage tiers comprising respective disjoint subsets of the plurality of object storage servers. The burst buffer appliance can optionally communicate with a plurality of clients over the network and process requests from the clients.

According to one aspect of the invention, the FUSE object storage device provides an interface to, for example, a parallel log-structured file system (PLFS) and/or a Lustre clustered file system.

The object storage servers in the first storage tier may be configured to interface with object storage targets of a first type and the object storage servers in the second storage tier may be configured to interface with object storage targets of a second type different than the first type. For example, the object storage targets of the first type may comprise non-volatile electronic storage devices such as flash storage devices, and the object storage targets of the second type may comprise disk storage devices.

As noted above, illustrative embodiments described herein provide significant improvements relative to conventional arrangements. In some of these embodiments, use of a flash storage tier in conjunction with a disk storage tier allows dynamic balancing of storage capacity and IO throughput requirements in a cluster file system, thereby allowing particular levels of performance to be achieved at a significantly lower cost than would otherwise be possible. Similar improvements are provided using other numbers and types of storage tiers, with migration between the tiers being controlled by one or more burst buffers of the cluster file system.

BRIEF DESCRIPTION OF THE DRAWINGS

FIG. 2 illustrates an exemplary stack for the OSD-FUSE of FIG. 1;

FIG. 3 illustrates an exemplary FUSE-OSD mapping process incorporating aspects of the present invention; and FIGS. 4 through 6 illustrate exemplary pseudo code for the OSD-FUSE of FIG. 1.

DETAILED DESCRIPTION

Figure 1:
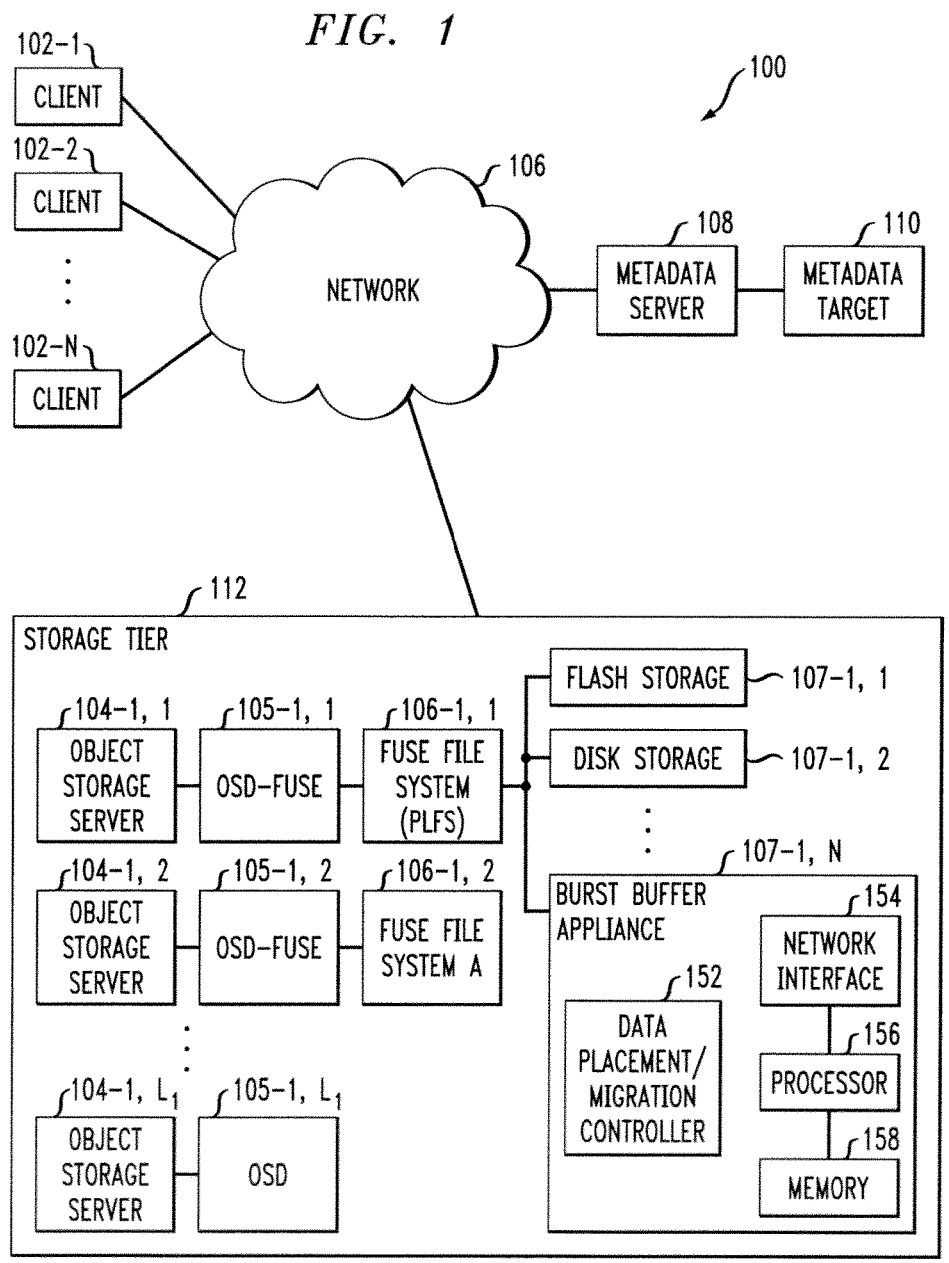
FIG. 1 is a block diagram of a cluster file system having a FUSE file system interface in an illustrative embodiment of the invention.

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices.

According to one aspect of the invention, a conventional cluster file system, such as an exemplary Lustre cluster file system, is modified to include a FUSE object storage device (OSD-FUSE) using an existing FUSE virtual file system abstraction. In this manner, any file system having a FUSE interface can be integrated into the cluster file system. For example, as discussed further below, file systems having flash storage and/or a burst buffer appliance can be integrated into the cluster file system using the OSD-FUSE. In this manner, flash storage tiers can be added to existing cluster file systems, such as Lustre storage systems, without requiring any significant modification to applications or Lustre clients.

According to a further aspect of the invention, a mapping is provided between a FUSE virtual file system and an OSD interface of the cluster file system. In this manner, any file system having a FUSE interface can be integrated into the cluster file system.

FIG. 1 shows a cluster file system 100 configured in accordance with an illustrative embodiment of the present invention. The cluster file system 100 comprises a plurality of clients 102 and a plurality of object storage servers 104. More particularly, the cluster file system 100 comprises N clients denoted 102-1, 102-2, . . . 102-N, and a group of object storage servers denoted 104-1,1 through 104-1,$L_1$. Each of the object storage servers 104 has a corresponding storage device 105 which may comprise a file system interface, storage array or other type of storage device. Thus, the object storage servers 104-1,1 through 104-1,$L_1$ have associated object storage devices 105-1,1 through 105-1,$L_1$. In one exemplary embodiment, object storage devices 105-1,1 and 105-1,2 comprise OSD-FUSE interfaces incorporating aspects of the present invention. In addition, object storage devices 105-1,$L_1$ comprises a conventional OSD, apparent to a person of ordinary skill in the art.

The clients 102 and the object storage servers 104 communicate with one another over a network 106. The storage devices 105 are also referred to herein as object storage targets of their corresponding object storage servers 104.

The cluster file system 100 further comprises a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

Storage arrays utilized in the cluster file system 100 may comprise, for example, storage products such as VNX and Symmetrix VMAX, both commercially available from EMC Corporation of Hopkinton, Mass. A variety of other storage products may be utilized to implement at least a portion of the object storage targets and metadata target of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks, such as proprietary vendor networks including Cray's Gemini and *Aries* networks. The term "network" as used herein is therefore intended to be broadly construed, so as to encompass a wide variety of different network arrangements, including combinations of multiple networks possibly of different types.

The object storage servers 104 in the present embodiment are arranged into a second storage tier 112, although it is to be appreciated that multiple storage tiers may be used in other embodiments. As noted above, each of the storage devices 105 may be viewed as being representative of an object storage target of the corresponding one of the object storage servers 104.

The client 102 may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

In a multiple storage tier implementation, the different storage tiers 112 may comprise different types of storage devices 107 having different performance characteristics. Each of the object storage servers 104 is configured to interface with a corresponding object storage target in the form of a storage device 107 which may comprise a storage array. The object storage servers 104 in a first storage tier 112 are configured to interface with object storage targets of a first type and the object storage servers 104 in a second storage tier 112 are configured to interface with object storage targets of a second type different than the first type. In an exemplary embodiment, the object storage targets of the first type may comprise respective flash storage devices 107-1, 1, and the object storage targets of the second type may comprise respective disk storage devices 107-1, 2.

As shown in FIG. 1, object storage devices 105-1,1 and 105-1,2 comprise OSD-FUSE interfaces that incorporate aspects of the invention to provide access to any of the many file systems having FUSE implementations. In the exemplary embodiment of FIG. 1, object storage device 105-1,1 provides access to a PLFS file system 106-1, 1 and object storage device 105-1,2 provides access to FUSE file system A 106-1, 2, thereby leveraging the FUSE interface. For a more detailed discussion of an exemplary PLFS file system 106-1, 1, see, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein. For a more detailed discussion of a FUSE file system, see, for example, Sumit Singh, "Develop your own filesystem with FUSE" (Feb. 28, 2006), incorporated by reference herein.

The exemplary PLFS file system 106-1, 1 provides access to a burst buffer appliance 107-1, N, flash storage 107-1, 1 and disk storage 107-1, 2. In the exemplary embodiment of FIG. 1, the storage tiering is done within each object storage server. Thus, in the exemplary implementation, each object storage server (OSS) internally contains both flash storage 107-1, 1 and disk storage 107-1, 2.

The flash storage devices 107-1, 1 are generally significantly faster in terms of read and write access times than the disk storage devices 107-1, 2. The flash storage devices 107-1, 1 are therefore considered "fast" devices in this embodiment relative to the "slow" disk storage devices 107-1, 2. Accordingly, the cluster file system 100 may be characterized in the present embodiment as having a "fast" storage tier 112 and a "slow" storage tier 112, where "fast" and "slow" in this context are relative terms and not intended to denote any particular absolute performance level. These storage tiers comprise respective disjoint subsets of the object storage servers 104 and their associated object storage targets 105. However, numerous alternative tiering arrangements may be used, including three or more tiers each providing a different level of performance. The particular storage devices used in a given storage tier may be varied in other embodiments and multiple distinct storage device types may be used within a single storage tier.

Also, although only a single object storage target is associated with each object storage server 104 in the FIG. 1 embodiment, other embodiments may associate multiple object storage targets with each object storage server. In addition, although only a single storage tier 112 is shown in FIG. 1, other embodiments may comprise multiple storage tiers.

The flash storage devices 107-1, 1 may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used to implement at least a portion of the storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices 107-1, 1 generally provide higher performance than the disk storage devices 107-1, 2 but the disk storage devices 107-1, 2 generally provide higher capacity at lower cost than the flash storage devices 107-1, 1. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

The cluster file system 100 further comprises a burst buffer appliance 107-1, N configured to communicate with clients 102, object storage servers 104 and metadata servers 108 over the network 106. The burst buffer appliance 107-1, N in the present embodiment is assumed to comprise a flash memory or other high-speed memory having a substantially lower access time than the other storage elements in storage tier 112. The burst buffer appliance 107-1, N may optionally comprise an analytics engine and may include other components.

Although flash memory will often be used for the high-speed memory of the burst buffer appliance 107-1, N, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients 102 executing on compute nodes (not shown) and a file system such as storage tier 112, for storing bursts of data associated with different types of IO operations.

In the FIG. 1 embodiment, storage tiering control functionality can be implemented in the burst buffer appliance 107-1, N in a manner that avoids the need for any significant changes to clients 102, object storage servers 104, metadata server 108 or applications running on those devices.

In the embodiment of FIG. 1, the burst buffer appliance 107-1, N optionally comprises a data placement and migration controller 152. The data placement and migration controller 152 is configured to implement storage tiering control functionality for the storage tiers 112 which as noted above comprise respective disjoint subsets of the object storage servers 104. The burst buffer appliance 107-1, N is thereby configured to control movement of data between the storage devices 105 of the storage tiers 112. Examples of such movement will be described below. The data placement and migration controller 152 may be viewed as one possible example of what is more generally referred to herein as a "controller," and numerous alternative controllers having various configurations may be used in a given metadata server in other embodiments.

The burst buffer appliance 107-1, N further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the burst buffer appliance 107-1, N is network interface circuitry 154. The network interface circuitry 154 allows the burst buffer appliance 107-1, N to communicate over the network 106 with the clients 102, object storage servers 104 and metadata servers 108. The network interface circuitry 154 may comprise, for example, one or more conventional transceivers.

The data placement and migration controller 152 of the burst buffer appliance 107-1, N may be implemented at least in part in the form of software that is stored in memory 158 and executed by processor 156.

The burst buffer appliance 107-1, N comprising processor, memory and network interface components as described above is an example of what is more generally referred to herein as a "processing device." Each of the clients 102, object storage servers 104 and metadata servers 108 may similarly be implemented as a processing device comprising processor, memory and network interface components.

Although only a single burst buffer appliance 107-1, N is shown in the FIG. 1 embodiment, a given cluster file system in other embodiments may comprise multiple burst buffer appliances 107-1, N.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by providing one or more OSD-FUSE interfaces 105-1, 1 that allow any file system having a FUSE implementation to connect to the exemplary Lustre cluster file system 100.

As will be described, such arrangements advantageously allow for transparent inclusion of a flash storage tier and/or a burst buffer appliance 107-1, N in a cluster file system in a manner that avoids the need for any significant changes to clients, object storage servers, metadata servers or applications running on those devices. Again, other types and configurations of multiple storage tiers and associated storage devices may be used. Also, multiple burst buffer appliances 107-1, N may be implemented in the system in other embodiments.

It should be noted with regard to the illustrative embodiment of FIG. 1 that relatively minor modifications may be made to one or more applications or other system elements or components in order to achieve additional improvements. For example, a job scheduler (not shown) or other similar component within the system 100 can also be modified so as to take full advantage of the available storage tiering and/or burst buffer appliance 107-1, N functionality. Also, some relatively minor modifications may be made to at least a portion of the object storage servers 104. For example, object storage servers of a storage tier 112 in the system 100 may be optimized for use with the corresponding storage device type of their corresponding storage tier.

FIG. 2 illustrates an exemplary stack 200 for the OSD-FUSE 105-1, 1 of FIG. 1. As indicated above, the exemplary OSD-FUSE 105-1, 1 allows a file system having a FUSE implementation, such as an exemplary PLFS file system 106-1, 1, to interface with a cluster file system 100 in a manner that avoids the need for any significant changes to clients 102, object storage servers 104, metadata server 108 or applications running on those devices. Thus, layers 210, 220, 230, 250 and 260 of the exemplary stack 200 are unmodified, relative to conventional Lustre and PLFS implementations.

Layer 240 is a new layer of the stack 200, corresponding to the OSD-FUSE 105-1,1 of FIG. 1 and is discussed further below in conjunction with FIGS. 3-6. In this manner, an additional file system plug in or file system interface is provided for the abstract layer of Lustre (in addition to, for example, existing ZFS and ldiskfs plug ins/file system interfaces).

Layer 270 is also a modified layer of the stack 200, corresponding to the modified burst buffer implementation of PLFS which comprises the data migration functionality of burst buffer PLFS in accordance with U.S. patent application Ser. No. 13/928,985, filed Jun. 27, 2013, entitled "Cluster File System with a Burst Buffer Appliance for Controlling Movement of Data Among Storage Tiers," incorporated by reference herein, as well as conventional PLFS burst buffer functionality. As discussed above, the burst buffer appliance 107-1, N communicates with flash storage layer 280 and disk storage layer 290 of FIG. 2 to migrate data among various storage tiers 112.

For a more detailed discussion of stacks for Lustre clustered file systems, see, for example, A. Dilger et al., "Lustre on ZFS," Lustre Admin and Developer Workshop (Sep. 24, 2012), incorporated by reference herein.

As previously indicated, Lustre provides a well-defined OSD Interface comprising, for example, object operations, as well as data methods for write, read, and punch (a type of write operation). In addition, FUSE provides a well-defined interface that has allowed a number of file systems to provide FUSE implementations. One aspect of the invention provides techniques for mapping FUSE to an OSD. As discussed hereinafter, OSD is object-based while FUSE is file-based. Thus, a FUSE file is created for each OSD object. In addition, OSD has a transactional approach, while FUSE does not have a transactional approach. Thus, aspects of the invention provide transactional support for FUSE.

FIG. 3 illustrates an exemplary FUSE-OSD mapping process 300 incorporating aspects of the present invention. Generally, the FUSE-OSD mapping process 300 maps between Lustre operations, such as write, read, unlink and create.

The exemplary FUSE-OSD mapping process 300 comprises a first section 310 for adapting the file-based approach of FUSE to the object-based OSD approach. In one exemplary embodiment, a FUSE file is created for each OSD object. In one extension, as discussed further below in conjunction with FIGS. 3-6, the OSD-FUSE 105-1, 1 optionally employs a hierarchical directory structure if too many files are created for a single directory in the FUSE filesystem.

The exemplary FUSE-OSD mapping process 300 comprises a second section 320 to address the fact that punch does not have an existing FUSE mapping. Generally, a punch function deallocates space within an existing file (i.e., makes a hole in the existing file). In one exemplary embodiment, space is deallocated by creating a zero-filled buffer along the punch dimensions and write the buffer. This provides correct behavior because punch creates a hole in the file and a hole, that when read, looks like zero-filled data. Thus, instead of actually creating a hole (which would be more space-efficient), the exemplary embodiment creates "fake" data that looks like a hole. This approach is correct but space-inefficient.

In an alternate embodiment, a punch method can be added to the published FUSE interface. In this manner, FUSE filesystems could choose to implement the punch method or they could default to the above zero-filled buffer method.

The exemplary FUSE-OSD mapping process 300 comprises a third section 330 to adapt the non-transactional FUSE file system to the transactional approach of OSD. Generally, OSD is transactional because Lustre needs to make coordinated changes to a set of OSD files (such as simultaneously updating file data and file metadata). One way to deal with this is to run the OSSs 104 in a battery-backed device to reduce the probability of failure. When there is a power interruption, the battery-backed device will give the system sufficient time to shut down in a controlled manner.

In an alternate implementation, transactional support can be added to the OSD-FUSE layer which would require that the FUSE file systems 106 also have transactional support. PLFS is an example of a FUSE file system 106 that can provide transactional support. In another alternate implementation, the non-transactional nature of a FUSE file system is allowed to increase the probability of corruption, and a recovery tool, such as fsck, might need to be run more frequently following failures.

FIG. 4 illustrates exemplary pseudo code 400 for an object create function for the OSD-FUSE 105 of FIG. 1. As shown in FIG. 4, the exemplary pseudo code 400 determines where a given object should be stored, ensures that a path exists to the target location and creates a file for the object by calling the corresponding FUSE function. In addition, the exemplary pseudo code 400 creates an N deep directory hierarchy (N is a mount option) and optimizes the created directories in a cache.

FIG. 5 illustrates exemplary pseudo code 500 for an object delete function for the OSD-FUSE 105 of FIG. 1. As shown in FIG. 5, the exemplary pseudo code 500 determines where a given object should be stored and unlinks the file by calling the corresponding FUSE function.

FIG. 6 illustrates exemplary pseudo code 600 for an object punch function for the OSD-FUSE 105 of FIG. 1. As shown in FIG. 6, the exemplary pseudo code 600 determines where a given object should be stored and determines whether the FUSE file system 106 has implemented a punch function. The punch function is called if it exists. If the punch function is not available, the zero-filled buffer method is employed.

It is to be appreciated that the particular operations and associated messaging illustrated in FIGS. 3 through 6 are exemplary only, and numerous other types of operations and messaging may be used in other embodiments. In addition, while FIGS. 4 through 6 provide exemplary pseudo code for a number of exemplary functions, additional functions can be provided for the OSD-FUSE 105 based on the disclosure herein, as would be apparent to a person of ordinary skill in the art.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the cluster file system 100. Such components can communicate with other elements of the cluster file system 100 over any type of network or other communication media.

As indicated previously, components of a burst buffer appliance as disclosed herein can be implemented at least in part in the form of one or more software programs stored in memory and executed by a processor of a processing device. A memory having such program code embodied therein is an example of what is more generally referred to herein as a "computer program product."

The cluster file system 100 or portions thereof may be implemented using one or more processing platforms each comprising a plurality of processing devices. Each such processing device may comprise processor, memory and network interface components of the type illustrated for burst buffer appliance 107-1, N in FIG. 1.

As indicated above, cluster file system functionality such as that described in conjunction with FIGS. 1 through 6 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from burst buffer implemented storage tiering control functionality as described herein. Also, the particular configurations of system and device elements shown in FIG. 1 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A FUSE object storage device of a cluster file system, comprising:
   a memory; and
   at least one processing device coupled to a memory, configured to:
   communicate with at least one object storage server of the cluster file system; and
   provide an interface between said cluster file system and a parallel log structured file system having a FUSE implementation and comprising a burst buffer appliance, wherein said burst buffer appliance comprises a high-speed memory that provides a buffer between a plurality of clients on one or more compute nodes and said cluster file system for storing bursty data associated with input-output (JO) operations, wherein said interface maps, using said FUSE object storage device associated with said at least one object storage server, one or more file-based operations of said FUSE implementation to one or more object-based operations of said cluster file system by creating a plurality of files, in a FUSE file system, for a plurality of objects of said FUSE object storage device.

2. The object storage device of claim 1 wherein said burst buffer appliance is configured to communicate with a plurality of object storage servers of the cluster file system over a network.

3. The object storage device of claim 2 wherein said burst buffer appliance is configured to implement storage tiering control functionality for at least first and second storage tiers comprising respective disjoint subsets of the plurality of object storage servers.

4. The object storage device of claim 3 wherein the burst buffer appliance further comprises a controller to implement said storage tiering control functionality.

5. The object storage device of claim 1 wherein said burst buffer appliance is configured to control movement of data between first and second storage tiers.

6. The object storage device of claim 1 wherein the burst buffer appliance is further configured to communicate with said plurality of clients over the network and to process requests from said clients.

7. The object storage device of claim 1 wherein the cluster file system comprises a Lustre file system.

8. The object storage device of claim 1 wherein said burst buffer appliance comprises a flash storage device.

9. The object storage device of claim 1 wherein said interface is further configured to adapt one or more non-transactional aspects of said FUSE implementation to a transactional approach of said cluster file system.

10. A method comprising:
configuring a FUSE object storage device in a cluster file system to communicate with at least one object storage server of the cluster file system; and
providing an interface in the FUSE object storage device between said cluster file system and a parallel log structured file system having a FUSE implementation and comprising a burst buffer appliance, wherein said burst buffer appliance comprises a high-speed memory that provides a buffer between a plurality of clients on one or more compute nodes and said cluster file system for storing bursty data associated with input-output (IO) operations, wherein said interface maps, using said FUSE object storage device associated with said at least one object storage server, one or more file-based operations of said FUSE implementation to one or more object-based operations of said cluster file system by creating a plurality of files, in a FUSE file system, for a plurality of objects of said FUSE object storage device.

11. The method of claim 10 wherein said burst buffer appliance is configured to communicate with a plurality of object storage servers of the cluster file system over a network.

12. The method of claim 11 wherein said burst buffer appliance is configured to implement storage tiering control functionality for at least first and second storage tiers comprising respective disjoint subsets of the plurality of object storage servers.

13. The method of claim 10 wherein said burst buffer appliance is configured to control movement of data between first and second storage tiers.

14. The method of claim 10 wherein the cluster file system comprises a Lustre file system.

15. The method of claim 10 wherein said burst buffer appliance comprises a flash storage device.

16. The method of claim 10 wherein said interface is further configured to adapt one or more non-transactional aspects of said FUSE implementation to a transactional approach of said cluster file system.

17. A computer program product comprising a non-transitory machine-readable storage medium having encoded therein executable code of one or more software programs, wherein the one or more software programs when executed cause the burst buffer appliance to perform the steps of the method of claim 10.

18. A cluster file system comprising:
at least one object storage server coupled to a FUSE object storage device, wherein said FUSE object storage device is configured to:
communicate with said at least one object storage server of the cluster file system; and
provide an interface between said cluster file system and a parallel log structured file system having a FUSE implementation and comprising a burst buffer appliance, wherein said burst buffer appliance comprises a high-speed memory that provides a buffer between a plurality of clients on one or more compute nodes and said cluster file system for storing bursty data associated with input-output (TO) operations, wherein said interface maps, using said FUSE object storage device associated with said at least one object storage server, one or more file-based operations of said FUSE implementation to one or more object-based operations of said cluster file system by creating a plurality of files, in a FUSE file system, for a plurality of objects of said FUSE object storage device.

19. The cluster file system of claim 18 wherein said burst buffer appliance is configured to control movement of data between first and second storage tiers.

20. The cluster file system of claim 18 wherein the cluster file system comprises a Lustre file system.

21. The cluster file system of claim 18 wherein said burst buffer appliance comprises a flash storage device.

* * * * *

UNITED STATES PATENT AND TRADEMARK OFFICE
CERTIFICATE OF CORRECTION

PATENT NO. : 9,858,290 B1
APPLICATION NO. : 13/928966
DATED : January 2, 2018
INVENTOR(S) : John M. Bent et al.

Page 1 of 1

It is certified that error appears in the above-identified patent and that said Letters Patent is hereby corrected as shown below:

In the Claims

Column 10, Line 33, in Claim 1, replace "with input-output (JO) operations," with -- with input-output (IO) operations, --

Column 12, Line 23, in Claim 18, replace "with input-output (TO) operations," with -- with input-output (IO) operations, --

Signed and Sealed this
Eighth Day of June, 2021

Drew Hirshfeld
*Performing the Functions and Duties of the
Under Secretary of Commerce for Intellectual Property and
Director of the United States Patent and Trademark Office*